US011422596B2

(12) United States Patent
Shabbir et al.

(10) Patent No.: US 11,422,596 B2
(45) Date of Patent: Aug. 23, 2022

(54) SYSTEMS AND METHODS FOR AIR MOVER SPEED OPTIMIZATION BASED ON INFORMATION OF AIR MOVER SPEED VERSUS AIR MOVER POWER CURVE

(71) Applicant: Dell Products L.P., Round Rock, TX (US)

(72) Inventors: Hasnain Shabbir, Round Rock, TX (US); Dominick A. Lovicott, Jarrell, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/864,711

(22) Filed: May 1, 2020

(65) Prior Publication Data

US 2021/0341978 A1 Nov. 4, 2021

(51) Int. Cl.
*G06F 1/20* (2006.01)
*G05B 15/02* (2006.01)

(52) U.S. Cl.
CPC .............. *G06F 1/206* (2013.01); *G05B 15/02* (2013.01)

(58) Field of Classification Search
CPC ................................ G06F 1/206; G05B 15/02
See application file for complete search history.

(56) References Cited

U.S. PATENT DOCUMENTS

| 7,941,231 | B1* | 5/2011 | Dunn | G06F 1/203 |
| | | | | 700/17 |
| 10,620,674 | B2* | 4/2020 | Bhatia | G06F 1/206 |
| 2007/0098374 | A1* | 5/2007 | Fujiwara | G06F 1/203 |
| | | | | 388/811 |
| 2014/0114496 | A1* | 4/2014 | Berry | F04D 27/00 |
| | | | | 700/299 |
| 2019/0150316 | A1* | 5/2019 | Dayal | G06F 1/20 |
| | | | | 361/679.48 |

OTHER PUBLICATIONS

Brandon Rogers, "How to Measure Velocity and Flow;" https://www.setra.com/blog/how-to-measure-velocity-and-flow; p. 1, Published Jan. 9, 2017. (Year: 2017).*

* cited by examiner

*Primary Examiner* — Chad G Erdman
(74) *Attorney, Agent, or Firm* — Jackson Walker L.L.P.

(57) ABSTRACT

An information handling system may include an information handling resource, an air mover configured to drive air to cool the information handling resource, and a thermal control system for controlling the air mover and configured to determine an air speed requirement for the air mover and regulate an air speed of the air mover to optimize an airflow-versus-power efficiency of the air mover while satisfying the air speed requirement.

8 Claims, 2 Drawing Sheets

SYSTEMS AND METHODS FOR AIR MOVER SPEED OPTIMIZATION BASED ON INFORMATION OF AIR MOVER SPEED VERSUS AIR MOVER POWER CURVE

TECHNICAL FIELD

The present disclosure relates in general to information handling systems, and more particularly to providing air mover speed optimization based on information of air mover speed versus air mover power curve.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Temperature control in an information handling system with air movers often involves use of a closed-loop feedback system that alters air mover speed in response to a sensed temperature in the information handling system. Airflow driven by an air mover may be a linear function of air mover speed, but power consumed by an air mover may scale exponentially (e.g., at a power of 3) with air mover speed. Approaches may be desired that optimize air mover speed based on air mover power consumption.

SUMMARY

In accordance with the teachings of the present disclosure, the disadvantages and problems associated with optimizing air mover speed in an information handling system may be substantially reduced or eliminated.

In accordance with embodiments of the present disclosure, an information handling system may include an information handling resource, an air mover configured to drive air to cool the information handling resource, and a thermal control system for controlling the air mover and configured to determine an air speed requirement for the air mover and regulate an air speed of the air mover to optimize an airflow-versus-power efficiency of the air mover while satisfying the air speed requirement.

In accordance with these and other embodiments of the present disclosure, a method may include determining an air speed requirement for an air mover and regulating an air speed of the air mover to optimize an airflow-versus-power efficiency of the air mover while satisfying the air speed requirement.

In accordance with these and other embodiments of the present disclosure, a thermal control system may include an output for communicating a control signal for regulating an air speed of an air mover and logic configured to determine an air speed requirement for the air mover and regulate an air speed of the air mover to optimize an airflow-versus-power efficiency of the air mover while satisfying the air speed requirement by communicating the control signal.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to determine an air speed requirement for an air mover and regulate an air speed of the air mover to optimize an airflow-versus-power efficiency of the air mover while satisfying the air speed requirement.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
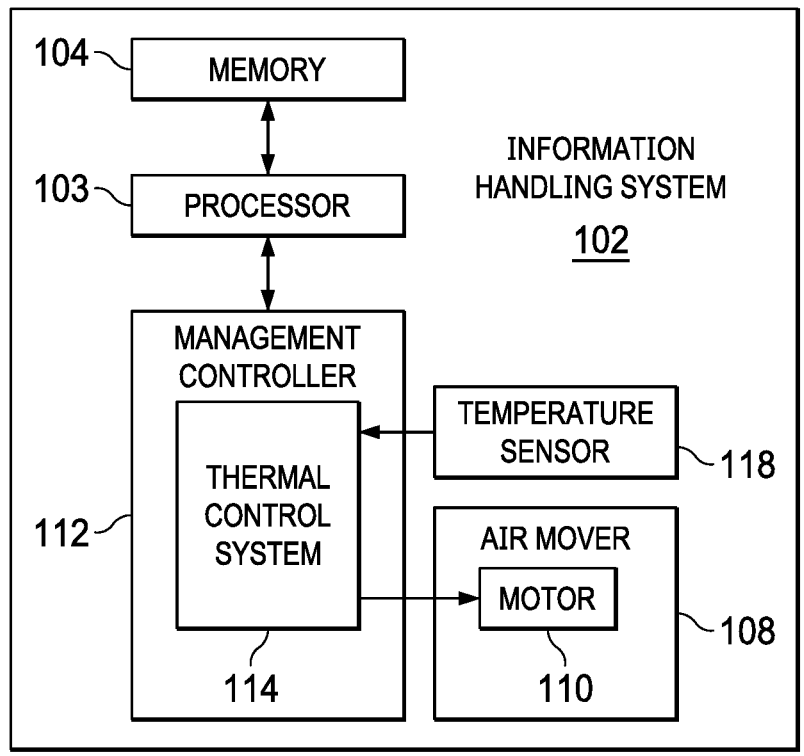
FIG. 1 illustrates a block diagram of an example information handling system, in accordance with embodiments of the present disclosure.
Figure 3:
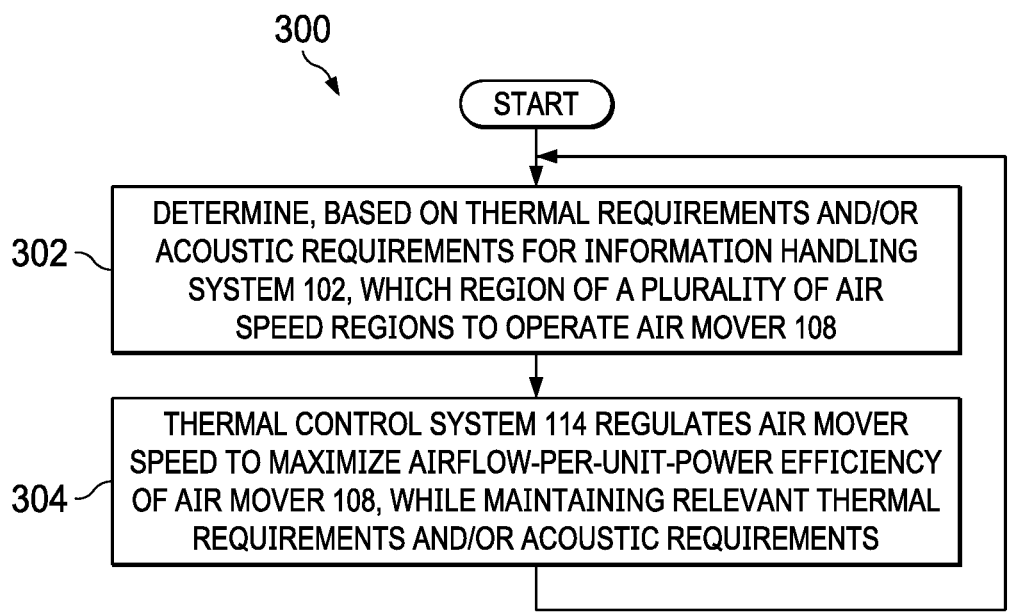
FIG. 3 illustrates a flow chart of an example method for air mover speed optimization based on information of air speed versus air mover power curve, in accordance with embodiments of the present disclosure.
Figure 2:
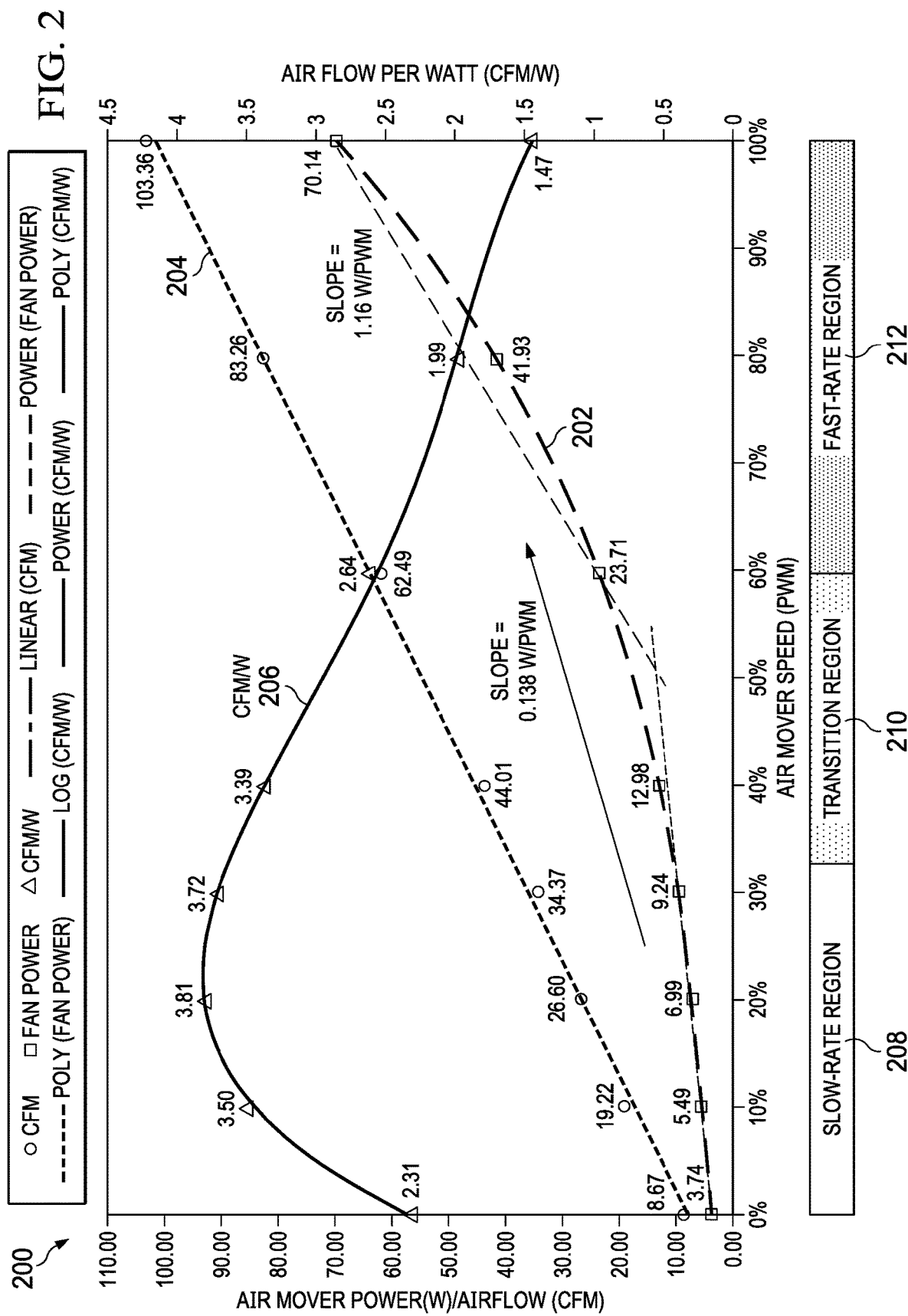
FIG. 2 illustrates a graph of example waveforms of air mover power versus air mover speed, airflow versus air mover speed, and airflow per watt versus air mover speed in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages, electro-mechanical devices (e.g., air movers), displays, and power supplies.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover 108, a management controller 112, and a temperature sensor 118.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by an air mover control signal (e.g., a pulse-width modulation signal) communicated from thermal control system 114 of management controller 112. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include a thermal control system 114. Thermal control system 114 may include any system, device, or apparatus configured to receive one or more signals indicative of one or more temperatures within information handling system 102 (e.g., one or more signals from one or more temperature sensors 118), and based on such signals, calculate an air mover driving signal (e.g., a pulse-width modulation signal)

to maintain an appropriate level of cooling, increase cooling, or decrease cooling, as appropriate, and communicate such air mover driving signal to air mover 108. Thermal control for air mover 108 by thermal control system 114 may be performed in any suitable manner, for example, as described in U.S. Pat. No. 10,146,190 entitled "Systems and Methods for Providing Controller Response Stability in a Closed-Loop System."

In addition, thermal control system 114 may also be configured to maintain acoustic limits and/or maintain acoustic preferences for sound generated by air mover 108, for example, as described in U.S. patent application Ser. No. 16/852,118, filed Apr. 17, 2020, and entitled "Systems and Methods for Acoustic Limits of Thermal Control System in an Information Handling System," which is incorporated by reference herein in its entirety.

Further, thermal control system 114 may also be configured to, in order to optimize air mover speed as a function of power consumed by air mover 108, utilize information regarding air mover speed versus air mover power to define potential air mover operating regions for maximizing cooling efficiency while maintaining cooling requirements and/or acoustic requirements of information handling system 102. This optimization functionality of thermal control system 114 is described in greater detail below with respect to FIGS. 2 and 3.

In some embodiments, thermal control system 114 may include a program of instructions (e.g., software, firmware) configured to, when executed by a processor or controller integral to management controller 112, carry out the functionality of thermal control system 114.

A temperature sensor 118 may be any system, device, or apparatus (e.g., a thermometer, thermistor, etc.) configured to communicate a signal to thermal control system 114 indicative of a temperature within information handling system 102.

In addition to processor 103, memory 104, air mover 108, management controller 112, and temperature sensor 118, information handling system 102 may include one or more other information handling resources. In addition, for the sake of clarity and exposition of the present disclosure, FIG. 1 depicts only one air mover 108 and temperature sensor 118. In embodiments of the present disclosure, information handling system 102 may include any number of air movers 108 and temperature sensors 118.

FIG. 2 illustrates a graph 200 of example waveforms including a waveform 202 of air mover power versus air mover speed, a waveform 204 of airflow versus air mover speed, and a waveform 206 of airflow per watt versus air mover speed in accordance with embodiments of the present disclosure.

As shown in FIG. 2, in a typical air mover 108, waveform 202 of air mover power versus air mover speed may be an third-order or higher-order polynomial function. Accordingly, a slope of waveform 202, which may be given in terms of unit power per unit air mover speed (e.g., W/% duty cycle of PWM driving signal for air mover 108) may increase with increasing air mover speed. For example, in the example waveform 202 of FIG. 2, such slope may increase by a factor of eight as air mover speed increases from low speeds (e.g., 10%-30% duty cycle) to higher speeds (e.g., 60%-100% duty cycle).

Also as shown in FIG. 2, in a typical air mover 108, waveform 204 of air flow versus air mover speed may be generally linear with a fairly constant slope.

Waveform 206 of airflow per watt versus air mover speed may effectively be an arithmetic division of waveform 202 by waveform 204 that depicts, for various air mover speeds, an airflow-per-unit-power (e.g., cubic feet per minute per watt (CFM/W)) efficiency.

In operation, thermal control system 114 may partition the air speed range (e.g., 0% PWM duty cycle to 100% duty cycle) of air mover 108 into a plurality of regions. While such partitioning is not limited to any particular number of regions, the example of FIG. 2 depicts three regions: a slow-rate region 208 (e.g., 0%-33% duty cycle), a transition region 210 (e.g., 33%-60% duty cycle), and a fast-rate region 212 (e.g., 60%-100% duty cycle).

Further, thermal control system 114 may determine, based on thermal requirements and/or acoustic requirements, which region of the plurality of regions to operate air mover 108. For example, if acoustic requirements place a limit of 30% PWM duty cycle for air mover speed, thermal control system 114 may determine slow-rate region 208 to be the region of operation. As another example, if acoustic requirements place a limit of 50% PWM duty cycle for air mover speed, thermal control system 114 may determine transition region 210 to be the region of operation. As a further example, if acoustic requirements place a limit of 80% PWM duty cycle for air mover speed, thermal control system 114 may determine fast-rate region 212 to be the region of operation.

Once the region of operation is determined, thermal control system 114 may regulate the air mover speed to maximize airflow-per-unit-power efficiency of air mover 108, while maintaining relevant thermal requirements and/or acoustic requirements. For example, if acoustic requirements place a limit of 30% PWM duty cycle for air mover speed, meaning operation in slow-rate region 208, thermal control system 114 may regulate, based on waveform 206 or other suitable information for determining airflow-per-unit-power efficiency at various air mover speeds, an optimum air mover speed (e.g., 20% PWM duty cycle in the example of FIG. 2) for air mover 108, and regulate air mover 108 to operate at such speed. As another example, if thermal requirements require 10% PWM duty cycle for air mover speed, meaning operation in slow-rate region 208, thermal control system 114 may determine, based on waveform 206 or other suitable information for determining airflow-per-unit-power efficiency at various air mover speeds, an optimum air mover speed (e.g., 20% PWM duty cycle in the example of FIG. 2) for air mover 108, and regulate air mover 108 to operate at such speed.

FIG. 3 illustrates a flow chart of an example method 300 for air mover speed optimization based on information of air speed versus air mover power curve, in accordance with embodiments of the present disclosure. According to one embodiment, method 300 may begin at step 302. As noted above, teachings of the present disclosure may be implemented in a variety of configurations of information handling system 102 and/or thermal control system 114. As such, the preferred initialization point for method 300 and the order of the steps comprising method 300 may depend on the implementation chosen.

At step 302, thermal control system 114 may determine, based on thermal requirements and/or acoustic requirements for information handling system 102, which region of a plurality of regions (e.g., slow-rate-region 208, transition region 210, and fast-rate region 212) to operate air mover 108.

At step 304, once the region of operation is determined, thermal control system 114 may regulate the air mover speed to maximize airflow-per-unit-power efficiency of air mover 108, while maintaining relevant thermal requirements and/or acoustic requirements. Steps 302 and 304 may repeat, and operation may vary in the event thermal requirements and/or acoustic requirements change.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102, thermal control system 114, or any other system operable to implement method 300. In certain embodiments, method 300 may be implemented partially or fully in software and/or firmware embodied in computer-readable media.

Although the foregoing discussion contemplates application systems and methods for closed-loop control of operation of an air mover, similar methods and systems may be generalized and applied to other closed-loop controls. For example, such similar methods and systems may be applied to generate a driving signal to any appropriate plant or component based on any measured process value other than a measured temperature and a setpoint value other than a setpoint temperature.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   an information handling resource;
   an air mover configured to drive air to cool the information handling resource, wherein the air mover is driven by a motor and an air speed of the air mover is controlled by a pulse width modulation (PWM) signal provided to the motor; and
   a thermal control system for controlling the air mover and configured to:
      determine an air speed requirement for the air mover wherein the air speed requirement comprises an acoustic-based limit for the air speed of the air mover;
      partition an air speed range of the air mover into a plurality of air speed regions wherein each of the plurality of air speed regions comprises a portion of the air speed range of the air mover;
      based on the air speed requirement, determine a selected air speed region from the plurality of air speed regions to operate the air mover; and
      regulate an air speed of the air mover within the selected air speed region to optimize an airflow-versus-power efficiency of the air mover while satisfying the air speed requirement;
      wherein a duty cycle of the PWM signal is within a range between 0% and 100% and wherein the plurality of air speed ranges includes three air speed ranges, wherein the three air speed ranges include a slow air speed range corresponding to a PWM signal duty cycle between 0% and 33%, a transition air speed range corresponding to a PWM signal duty cycle between 33% and 60%, and a fast air speed range corresponding to a PWM signal duty cycle between 60% and 100%.

2. The information handling system of claim 1, wherein the air speed requirement comprises a cooling requirement for the air speed of the air mover.

3. A method comprising:
   determining an air speed requirement for an air mover, wherein the air mover is driven by a motor and an air speed of the air mover is controlled by a pulse width modulation (PWM) signal provided to the motor;
   partitioning an air speed range of the air mover into a plurality of air speed regions wherein each of the plurality of air speed regions comprises a portion of the air speed range of the air mover;

based on the air speed requirement, determining a selected air speed region from the plurality of air speed regions to operate the air mover; and regulating an air speed of the air mover within the selected air speed region to optimize an airflow-versus-power efficiency of the air mover while satisfying the air speed requirement wherein the air speed requirement comprises an acoustic-based limit for the air speed of the air mover;

wherein a duty cycle of the PWM signal is within a range between 0% and 100% and wherein the plurality of air speed ranges includes three air speed ranges, wherein the three air speed ranges include a slow air speed range corresponding to a PWM signal duty cycle between 0% and 33%, a transition air speed range corresponding to a PWM signal duty cycle between 33% and 60%, and a fast air speed range corresponding to a PWM signal duty cycle between 60% and 100%.

4. The method of claim 3, wherein the air speed requirement comprises a cooling requirement for the air speed of the air mover.

5. A thermal control system comprising:

an output for communicating a control signal for regulating an air speed of an air mover, wherein the air mover is driven by a motor and an air speed of the air mover is controlled by a pulse width modulation (PWM) signal provided to the motor; and logic configured to:

determine an air speed requirement for the air mover wherein the air speed requirement comprises an acoustic-based limit for the air speed of the air mover;

partition an air speed range of the air mover into a plurality of air speed regions wherein each of the plurality of air speed regions comprises a portion of the air speed range of the air mover;

based on the air speed requirement, determine a selected air speed region from the plurality of air speed regions to operate the air mover; and regulate an air speed of the air mover within the selected air speed region to optimize an airflow-versus-power efficiency of the air mover while satisfying the air speed requirement by communicating the control signal;

wherein a duty cycle of the PWM signal is within a range between 0% and 100% and wherein the plurality of air speed ranges includes three air speed ranges, wherein the three air speed ranges include a slow air speed range corresponding to a PWM signal duty cycle between 0% and 33%, a transition air speed range corresponding to a PWM signal duty cycle between 33% and 60%, and a fast air speed range corresponding to a PWM signal duty cycle between 60% and 100%.

6. The thermal control system of claim 5, wherein the air speed requirement comprises a cooling requirement for the air speed of the air mover.

7. An article of manufacture comprising:

a non-transitory computer-readable medium; and computer-executable instructions carried on the computer-readable medium, the instructions readable by a processor, the instructions, when read and executed, for causing the processor to:

determine an air speed requirement for an air mover, wherein the air mover is driven by a motor and an air speed of the air mover is controlled by a pulse width modulation (PWM) signal provided to the motor and wherein the air speed requirement comprises an acoustic-based limit for the air speed of the air mover;

partition an air speed range of the air mover into a plurality of air speed regions wherein each of the plurality of air speed regions comprises a portion of the air speed range of the air mover;

based on the air speed requirement, determine a selected air speed region from the plurality of air speed regions to operate the air mover; and regulate an air speed of the air mover within the selected air speed region to optimize an airflow-versus-power efficiency of the air mover while satisfying the air speed requirement;

wherein a duty cycle of the PWM signal is within a range between 0% and 100% and wherein the plurality of air speed ranges includes three air speed ranges, wherein the three air speed ranges include a slow air speed range corresponding to a PWM signal duty cycle between 0% and 33%, a transition air speed range corresponding to a PWM signal duty cycle between 33% and 60%, and a fast air speed range corresponding to a PWM signal duty cycle between 60% and 100%.

8. The article of claim 7, wherein the air speed requirement comprises a cooling requirement for the air speed of the air mover.

* * * * *